US009900583B2

(12) United States Patent
Gu et al.

(10) Patent No.: US 9,900,583 B2
(45) Date of Patent: Feb. 20, 2018

(54) SYSTEM AND METHOD FOR GENERALIZED VIEW MORPHING OVER A MULTI-CAMERA MESH

(71) Applicant: Futurewei Technologies Inc., Plano, TX (US)

(72) Inventors: Jinwei Gu, Bridgewater, NJ (US); James M. A. Begole, Santa Clara, CA (US)

(73) Assignee: Futurewei Technologies, Inc., Plano, TX (US)

( * ) Notice: Subject to any disclaimer, the term of this patent is extended or adjusted under 35 U.S.C. 154(b) by 546 days.

(21) Appl. No.: 14/561,027

(22) Filed: Dec. 4, 2014

(65) Prior Publication Data

US 2016/0165215 A1 Jun. 9, 2016

(51) Int. Cl.
*H04N 13/02* (2006.01)
*G06K 9/20* (2006.01)
(Continued)

(52) U.S. Cl.
CPC ........... *H04N 13/0271* (2013.01); *G06K 9/20* (2013.01); *G06K 9/46* (2013.01); *G06T 15/205* (2013.01); *G06T 17/00* (2013.01); *G06T 19/20* (2013.01); *H04N 13/0022* (2013.01); *H04N 13/0059* (2013.01); *H04N 13/02* (2013.01);
(Continued)

(58) Field of Classification Search
CPC .............. H04N 13/0271; H04N 13/02; H04N 13/0242; H04N 13/0022; H04N 13/0259; G06T 7/0075; G06T 15/205; G06T 17/00; G06T 19/20; G06K 9/20; G06K 9/46
See application file for complete search history.

(56) References Cited

U.S. PATENT DOCUMENTS 6,424,351 B1 * 7/2002 Bishop .................... G06T 15/04
  345/427
6,608,923 B1 * 8/2003 Zhang .................... G06K 9/209
  345/419

(Continued)

FOREIGN PATENT DOCUMENTS

CN 101375599 A 2/2009

OTHER PUBLICATIONS

Zhang, Z., et al., "A Virtual View Genetation Method for Free-Viewpoint Video System," Proceedings of 2007 International Symposium on Intelligent Signal Processing and Communication System, Nov. 28-Dec. 1, 2007, pp. 156-159.

(Continued)

*Primary Examiner* — Shawn An
(74) *Attorney, Agent, or Firm* — Conley Rose, P.C.

(57) ABSTRACT

An apparatus is configured to perform a method for generalized view morphing. The method includes determining a camera plane based on a predetermined view point of a virtual camera associated with a desired virtual image, the camera plane comprising at least three real cameras; pre-warping at least three image planes such that all of the image planes are parallel to the camera plane, each image plane associated with one of the real cameras positioned in the camera plane; determining a virtual image plane by performing a linear interpolation morphing on the at least three image planes; and post-warping the virtual image plane to a predetermined pose.

18 Claims, 9 Drawing Sheets

(51) Int. Cl.
*G06K 9/46* (2006.01)
*G06T 15/20* (2011.01)
*G06T 17/00* (2006.01)
*G06T 19/20* (2011.01)
*H04N 13/00* (2018.01)

(52) U.S. Cl.
CPC ..... *H04N 13/0242* (2013.01); *G06K 2209/40* (2013.01); *G06T 2200/08* (2013.01); *G06T 2200/12* (2013.01); *G06T 2207/10028* (2013.01); *G06T 2207/20036* (2013.01); *G06T 2210/44* (2013.01); *G06T 2219/2016* (2013.01)

(56) References Cited

U.S. PATENT DOCUMENTS

| | | | |
|---|---|---|---|
| 8,504,136 | B1 | 8/2013 | Sun et al. |
| 2003/0052878 | A1* | 3/2003 | Han ................. G06T 17/005 345/420 |
| 2006/0066612 | A1 | 3/2006 | Yang et al. |
| 2008/0291279 | A1 | 11/2008 | Samarasekera et al. |
| 2010/0238160 | A1* | 9/2010 | Yea .................... G06T 3/0093 345/419 |
| 2014/0104307 | A1* | 4/2014 | Tanaka ................. G06F 3/005 345/619 |
| 2014/0270706 | A1* | 9/2014 | Pasko .............. H04N 21/21805 386/278 |
| 2014/0340397 | A1* | 11/2014 | Lievens .................. G06T 19/20 345/420 |

OTHER PUBLICATIONS

Foreign Communication From a Counterpart Application, PCT Application No. PCT/CN2015/096306, International Search Report dated Feb. 29, 2016, 4 pages.

Foreign Communication From a Counterpart Application, PCT Application No. PCT/CN2015/096306, Written Opinion fated Feb. 29, 2016, 7 pages.

Xiao, J., et al., Tri-view morphing', XP004608933, Computer Vision and Image Understanding, Academic Press, vol. 96, No. 3, Dec. 2004, pp. 345-366.

Chatkaewmanee, P., et al., "Object virtual viewing using adaptive tri-view morphing" XP006045759, IET Image Processing, vol. 7, No. 6, Aug. 2013, pp. 586-595.

Rhee, S., et al., "Stereoscopic View Synthesis by View Morphing," XP047396160, Network and Parallel Computing; [Lecture Notes in Computer Science;Lect.Notes Computer], Dec. 2008, pp. 924-933.

Xiao, J., et al., "From Images to Video: View Morphing of Three Images," XP055384884, Proc. of Uision, Modeling, and Visualization, Nov. 19, 2003, pp. 495-502.

Foreign Communication From A Counterpart Application, European Application No. 15864942.6, Extended European Search Report dated Aug. 3, 2017, 11 pages.

* cited by examiner

SYSTEM AND METHOD FOR GENERALIZED VIEW MORPHING OVER A MULTI-CAMERA MESH

TECHNICAL FIELD

The present disclosure relates generally to video processing, and more particularly, to a system and method for generalized view morphing over a multi-camera mesh.

BACKGROUND

Camera networks are now located virtually everywhere, from video surveillance cameras in factories, parking lots, highways, and banks, to cameras in smart homes for safety and elderly/kinder care, to cameras in smart meeting rooms for tele-presence and augmented reality. Tens of millions of such networked cameras are being installed every year to ensure sufficient coverage, yet blind spots still remain an issue.

SUMMARY

According to one embodiment, there is provided a method for generalized view morphing. The method includes determining a camera plane based on a predetermined view point of a virtual camera associated with a desired virtual image, the camera plane comprising at least three real cameras; pre-warping at least three image planes such that all of the image planes are parallel to the camera plane, each image plane associated with one of the real cameras positioned in the camera plane; determining a virtual image plane by performing a linear interpolation morphing on the at least three image planes; and post-warping the virtual image plane to a predetermined pose.

According to another embodiment, there is provided an apparatus for generalized view morphing. The apparatus includes at least one memory and at least one processor coupled to the at least one memory. The at least one processor is configured to determine a camera plane based on a predetermined view point of a virtual camera associated with a desired virtual image, the camera plane comprising at least three real cameras; pre-warp at least three image planes such that all of the image planes are parallel to the camera plane, each image plane associated with one of the real cameras positioned in the camera plane; determine a virtual image plane by performing a linear interpolation morphing on the at least three image planes; and post-warp the virtual image plane to a predetermined pose.

According to yet another embodiment, there is provided a non-transitory computer readable medium embodying a computer program. The computer program includes computer readable program code for determining a camera plane based on a predetermined view point of a virtual camera associated with a desired virtual image, the camera plane comprising at least three real cameras; pre-warping at least three image planes such that all of the image planes are parallel to the camera plane, each image plane associated with one of the real cameras positioned in the camera plane; determining a virtual image plane by performing a linear interpolation morphing on the at least three image planes; and post-warping the virtual image plane to a predetermined pose.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1A through 6, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

The following documents are hereby incorporated into the present disclosure as if fully set forth herein: (i) Furukawa and Ponce, "Accurate, dense and robust multi-view stereopsis," IEEE Trans. PAMI, 2010 (hereinafter "REF1"); (ii) M. Levoy, "Light Field Rendering," SIGGRAPH 1996 (hereinafter "REF2"); (iii) S. Seitz and C. Dyer, "View Morphing," SIGGRAPH 1996 (hereinafter "REF3"); (iv) T. Beier and S. Neely, "Feature-based image metamorphosis," SIGGRAPH 1992 (hereinafter "REF4"); and (v) S. Lee et al., "Image metamorphosis using snakes and free-form deformations," SIGGRAPH 1992 (hereinafter "REF5").

Camera networks can now be found virtually everywhere, from video surveillance cameras in factories, parking lots, highways, and banks, to cameras in smart homes for safety and elderly/kinder care, to cameras in smart meeting rooms for tele-presence and augmented reality. Tens of millions of such networked cameras are being installed every year to ensure sufficient coverage, yet blind spots still remain an issue. For example, the view captured by some cameras may not be ideal at some times of the day (e.g., noon) because of intense daylight, but may be suitable during other times of the day. In other networks, camera placement may result in occlusions due to one or more broken or malfunctioning cameras.

To resolve these issues, much research has been conducted on a "free-view" feature for camera networks. Using a free-view feature, overlapping visual information is captured by multiple nearby cameras. Then the overlapping visual information is used to generate a "virtual image" as though a virtual camera is located at the desired location and orientation. This process is also referred to as free-view morphing Free-view morphing (i.e., synthesizing any virtual view from existing cameras) is a highly desirable feature for many applications, such as video surveillance and digital forensics.

Figure 1A:
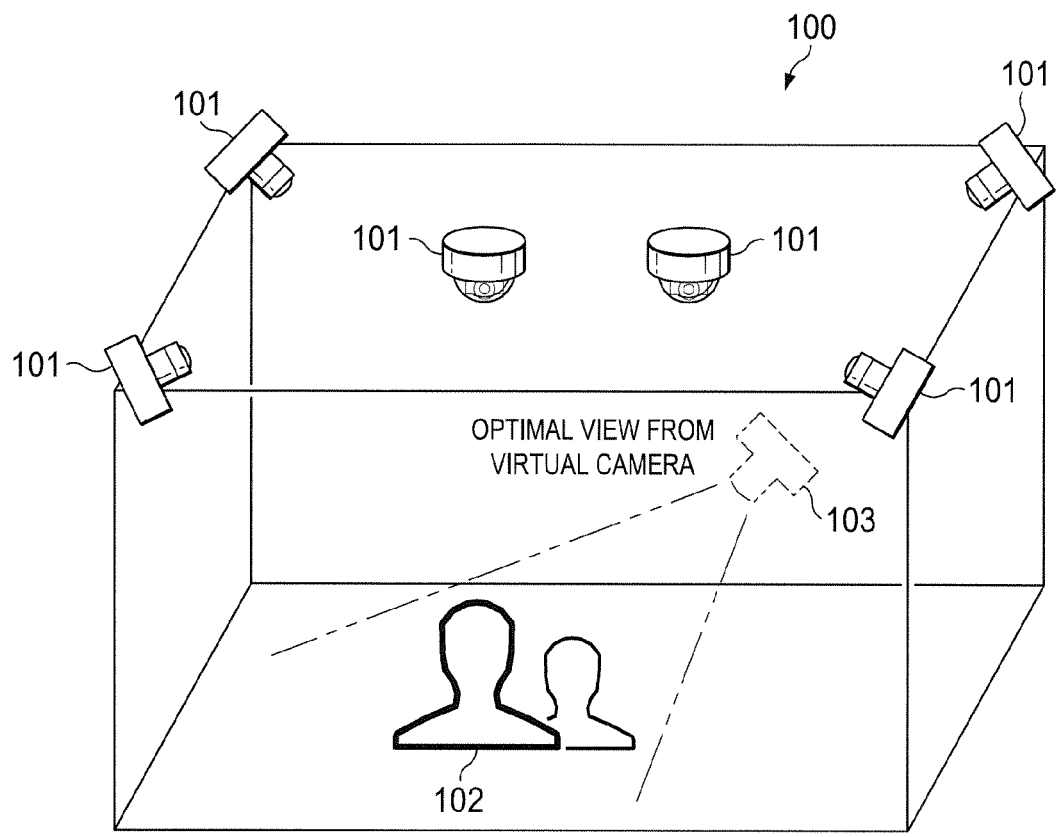
FIGS. 1A through 1C illustrate various example images of free-view morphing.
Figure 1B:
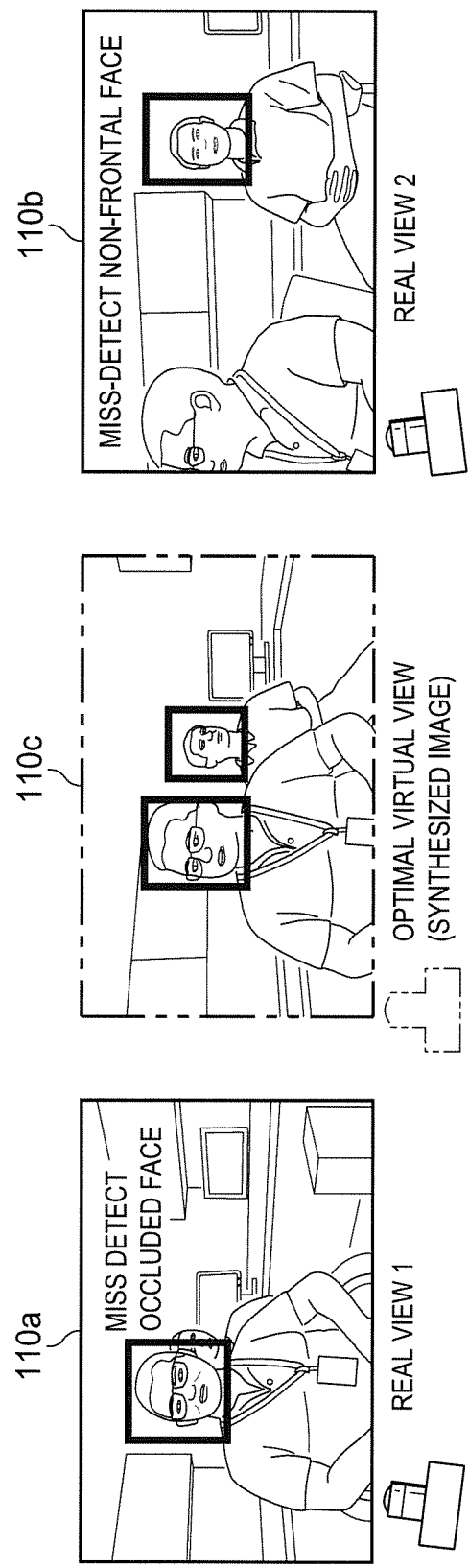
Figure 1C:
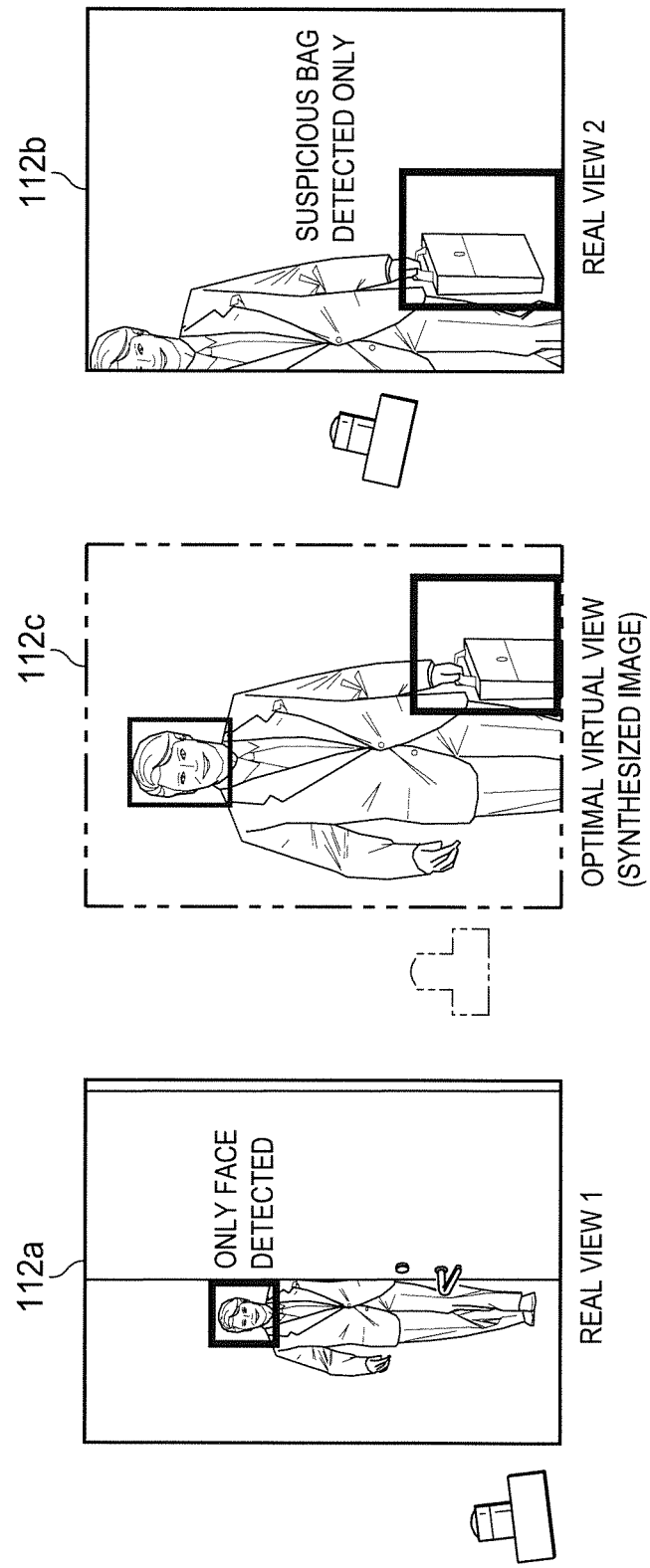

FIGS. 1A through 1C illustrate various examples of free-view morphing. In FIG. 1A, a three-dimensional space 100 (e.g., a conference room, parking lot, office, etc.) is equipped with a network of cameras 101 located in different locations and different orientations around the space 100. As shown in FIG. 1A, the cameras are positioned at high points in the space 100 and are directly generally downward. It will be understood, however, that additional or alternative cameras can be positioned at lower points (including at ground level or below ground) and can be oriented in other directions (e.g., upward, generally upward, or horizontally). While various ones of the cameras 101 may be capable of capturing part of a subject 102, none of the cameras 101 may be positioned or oriented so as to capture a particular desired feature or angle of the subject 102. A "virtual camera" 103 shows a location and orientation of a camera that (if it existed) would be capable of capturing the desired feature or desired angle of the subject 102.

For example, in FIGS. 1B and 1C, the images 110a-110b are captured from first real (i.e., actual, non-virtual) cameras 101, while the images 112a-112b are captured from second real cameras 101. Each of the images 110a-110b, 112a-112b captured by the cameras 101 is missing a key desired feature. For example, in the image 110a, only one face can be seen, though there are two people in the room. In the image 110b, only one of the faces can be seen from the front; the other face is seen in profile. In the image 112a, a bag is hidden behind a door. In the image 112b, the bag is shown, but only part of the person carrying the bag is shown.

Because of the missing information, use of any of the images 110a-110b, 112a-112b captured by the cameras 101 may be unsuitable for applications such as video surveillance. The objective of free-view morphing is to synthesize multiple images to generate a synthesized "virtual" image that appears as though the image was captured by a virtual camera, and includes all desired features. For example, the images 110a-110b are synthesized, using free-view morphing, into the virtual image 110c, while the images 112a-112b are synthesized into the virtual image 112c. The virtual images 110c, 112c appear as those they were taken from a virtual camera 102 in the optimal viewing position and orientation. Such synthesized virtual images 110c, 112c may be better suited for particular applications.

Figure 2C:
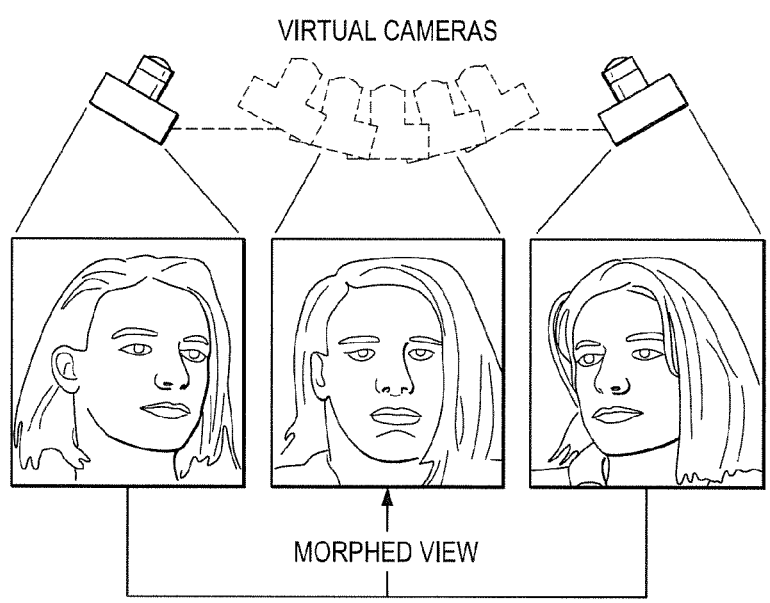
FIGS. 2A through 2C illustrate different examples of free-view morphing techniques.
Figure 2A:
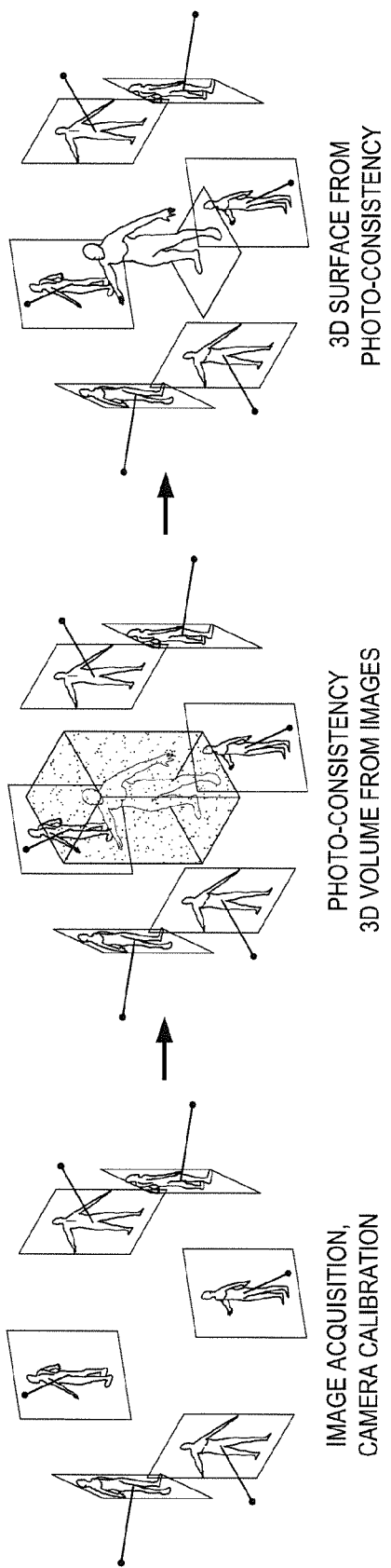
Figure 2B:
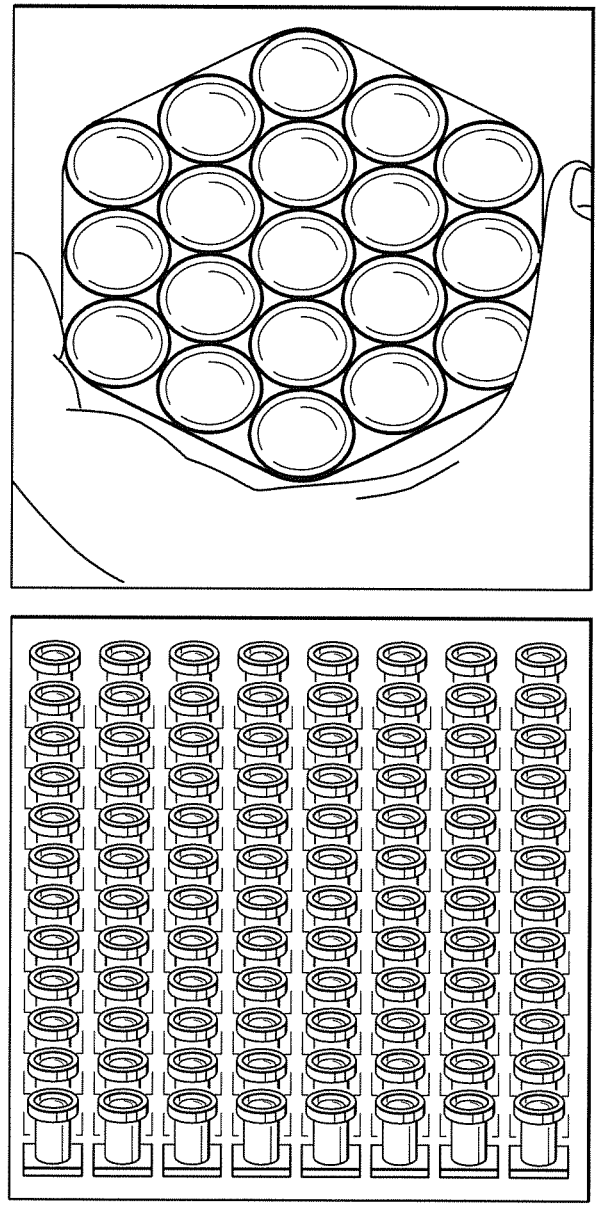

FIGS. 2A through 2C illustrate different examples of free-view morphing techniques. One technique, described in REF1 and shown in FIG. 2A, is to generate a three-dimensional (3D) textured model of a target scene using one or more multi-view stereo (MVS) algorithms. The 3D model can be rendered from any view. This technique typically generates good results. However, it is sensitive to challenging conditions such as textureless regions, occlusion, and specular or translucent materials. Also, it is computationally very expensive and can be slow depending on hardware. A second technique, described in REF2 and shown in FIG. 2B is light field rendering using a camera array. Light field rendering captures rays from a scene with a two-dimensional (2D) camera array and uses ray interpolation to create a synthesized view. This is a purely image-based technique, but it typically requires a dense camera array configuration and high bandwidth to capture, transmit, and store data. Also, this technique is typically characterized by low spatial resolution. A third technique, described in REF3 and shown in FIG. 2C, is view morphing. View morphing interpolates one or more intermediate views between two cameras with multiple user-specified features. View morphing is a low-complexity, low-cost technique. Like light field rendering, view morphing does not require 3D modeling. However, view morphing requires manual labeling of at least a few matched features in the images from two cameras. Also, view morphing is limited to interpolation for just two cameras.

To overcome the described shortcomings of these free-view morphing techniques, embodiments of this disclosure provide a novel system and method to synthesize virtual views from any virtual camera over the surface of a camera mesh. In such a multi-camera mesh, each camera is considered a vertex. The disclosed embodiments significantly generalize and extend other view morphing techniques from only two cameras to an arbitrary multi-camera mesh. The multi-camera mesh can be arranged in either a structured geographical or geometric pattern (e.g., eight cameras installed at the eight corners of a rectangular room to form a cube mesh), or an unstructured pattern (e.g., multiple cameras randomly placed in an irregular parking lot to form a general mesh).

Figure 3:
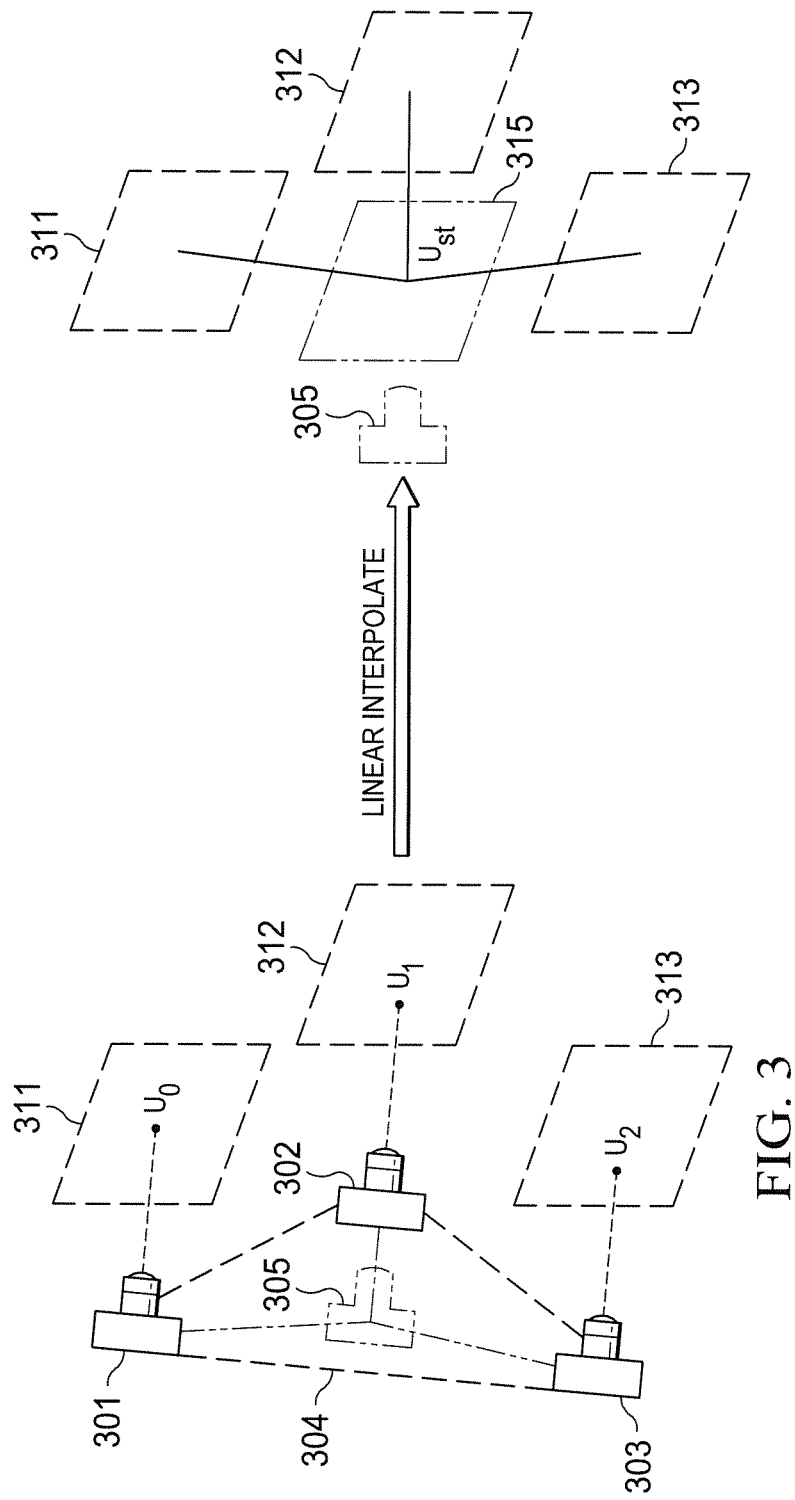
FIG. 3 illustrates a plurality of co-planar real cameras and a virtual camera that are part of a morphing operation.

The embodiments disclosed herein are based on a number of key concepts. A first key concept is that for co-planar cameras, if all the image planes are parallel to the camera plane, linear interpolation between the images is equivalent to camera interpolation (i.e., it is "shape-preserved" (see REF3)). For example, FIG. 3 illustrates a plurality of co-planar cameras 301-303. Each camera 301-303 captures an image across a corresponding image plane 311-313. Because the cameras 301-303 are oriented in the same direction, the image planes 311-313 are parallel to each other and parallel to the camera plane (indicated by the dashed triangle 304). Each image 301-303 captures an image of a point P of a physical 3D object (not shown). For example, the image of the point P in the image plane 311 is indicated at $u_0$; the image of the point P in the image plane 312 is indicated at $u_1$; and the image of the point P in the image plane 313 is indicated at $u_2$. A virtual camera 305 is located in the camera plane 304. Linear interpolation can be applied to the image planes 311-313 to determine a virtual image plane 315 that appears as though the image was captured by the virtual camera 305. Specifically, as shown in FIG. 3, the projection of the point P on the virtual image plane 315 (indicated as $u_{st}$) of the virtual camera 305 is equivalent to the barycentric weighted interpolation of its corresponding points $u_0$, $u_1$, $u_2$ in the three real image planes 311-313, as given by Equation (1):

$$u_{st}=K_{st}P=s\cdot u_0+t\cdot u_1+(1-s-t)\cdot u_2 \tag{1}$$

where $K_{st}$ is the intrinsic matrix of the virtual camera 305, and s and t are barycentric weighting factors.

This can be proven by inserting the following two definitions (2) and (3) into Equation (1) above:

$$u = KP = \begin{bmatrix} f_x & a & c_x \\ 0 & f_y & c_y \\ 0 & 0 & 1 \end{bmatrix} \cdot \begin{bmatrix} X \\ Y \\ Z \end{bmatrix} = \frac{1}{Z}\begin{bmatrix} (f_x X + aY)/Z + c_x \\ f_y Y/Z + c_y \\ 1 \end{bmatrix} \tag{2}$$

where K is the intrinsic matrix for a given camera, P is the location of the physical point whose image is captured (given by coordinates $\{X, Y, Z\}$), $f_x$ and $f_y$ are focal length values of the camera in the X and Y directions, a is the aspect ratio of the camera, and $c_x$ and $c_y$ are the camera center in the image plane in the X and Y directions.

$$K_{st} = s \cdot K_0 + t \cdot K_1 + \qquad (3)$$

$$(1-s-t) \cdot K_2 = \begin{bmatrix} sf_{0x} + tf_{1x} + & sa_0 + ta_1 + & sc_{0x} + tc_{1x} + \\ (1-s-t)f_{2x} & (1-s-t)a_2 & (1-s-t)c_{2x} \\ 0 & sf_{0y} + tf_{1y} + & sc_{0y} + tc_{1y} + \\ & (1-s-t)f_{2y} & (1-s-t)c_{2y} \\ 0 & 0 & 1 \end{bmatrix}$$

where $K_{st}$ is the intrinsic matrix of the virtual camera 305; $K_0$, $K_1$, $K_2$ are intrinsic matrices for the real cameras 301, 302, 303 respectively; $f_{0x}$, $f_{0y}$, $f_{1x}$, $f_{1y}$, $f_{2x}$, and $f_{2y}$ are focal length values of the cameras 301, 302, 303 respectively in the X and Y directions; $a_0$, $a_1$, $a_2$ are the aspect ratios of the cameras 301, 302, 303 respectively; and $c_{0x}$, $c_{0y}$, $c_{1x}$, $c_{1y}$, $c_{2x}$, $c_{2y}$ are the camera centers in the image planes 311-313 respectively in the X and Y directions.

A second key concept is to generalize the feature-based linear image morphing from two images to multiple images using the barycentric weighting. Specifically, to create an image with a set of features that are a barycentric weighted combination from the feature sets of multiple images, the following Equation (4) can be used, which is a generalized version of Equation (1):

$$u = w_1 * u_1 + w_2 * u_2 + \ldots + w_n * u_n \qquad (4)$$

where $w_1, w_2, \ldots w_n$ are barycentric weighting factors having values such that $w_1, w_2, \ldots w_n \geq 0$ and $w_1 + w_2 + \ldots + w_n = 1$.

The interpolated image I is given by:

$$I = w_1 * \text{warp}(I_1, u_1, u) + w_2 * \text{warp}(I_2, u_2, u) + \ldots + w_n * \text{warp}(I_n, u_n, u) \qquad (5)$$

where $I_1, I_2, \ldots, I_n$ are the real images captured by the real cameras, and warp(.) is the operation for any conventional two-image feature-based warping (such as those described in REF4 and REF5).

Figure 4:
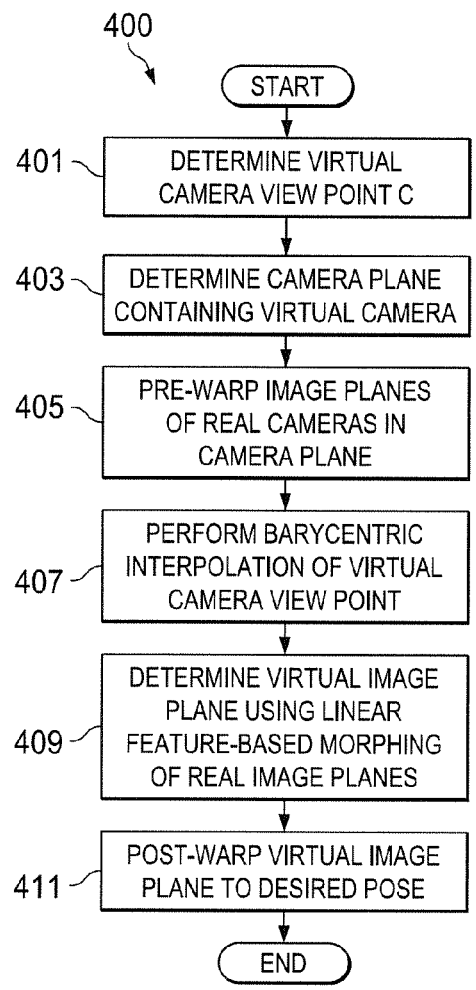
FIG. 4 illustrates a method for generalized view morphing over a multi-camera mesh in accordance with this disclosure.

FIG. 4 illustrates a method for generalized view morphing over a multi-camera mesh in accordance with this disclosure. The method 400 shown in FIG. 4 is based on the key concepts described above. The method 400 may be performed in association with the computing device 600 of FIG. 6 described below. However, the method 400 could also be used with any other suitable device or system.

In the method 400, multiple real cameras are arranged in a physical space. Different subsets of the cameras can form camera planes (also called "facets"), such as the camera plane 304 in FIG. 3. As one illustrative example, in a rectangular room with four walls and a camera generally disposed at each ceiling corner and floor corner, a total of eight cameras can form six different camera planes or facets. That is, the four cameras at the floor can form a first camera facet substantially in the shape of a rectangle, the four cameras at the ceiling can form a second substantially rectangular camera facet, and the four cameras associated with each wall can form third through sixth camera facets. Of course, the cameras could have other arrangements in other physical spaces. Moreover, the camera facets could be triangular or another shape, instead of rectangular.

Initially, at operation 401, a virtual camera view point C is determined. The virtual camera view point C is represented by location coordinates, orientation direction, and an intrinsic matrix K. The virtual camera view point could be determined based on a desired point of view of a physical object for surveillance or video forensics. For example, in FIG. 5A, a virtual camera 505 having a view point C is determined.

After the virtual camera view point is determined, the camera facet that contains the virtual camera view point is determined at operation 403. For example, in FIG. 5A, once the virtual camera 505 is determined, a camera facet 504 (with the real cameras 501-503 as vertices of the facet) is determined to contain the virtual camera 505.

After that, at operation 405, a pre-warp operation is performed for each camera vertex on the camera facet, so that all of the image planes are parallel to the camera plane. For example, in FIG. 5B, a pre-warp is performed on the image planes 511-513 so that all of the image planes 511-513 are parallel to the camera facet 504. To perform the pre-warping operation, a homography transformation for each camera is determined in order to rotate the image planes to be parallel to the camera plane. To do that, the camera plane normal with the camera centers on a camera facet (e.g., triangle, quadrilateral) is determined. The pre-warp homography transformation is given by:

$$H_i = K_i R (K_i R_i)^{-1} \qquad (6)$$

where $H_i$ is the homography transformation matrix for the real camera i in the camera facet (e.g., cameras 511-513), $K_i$ is the intrinsic matrix of the real camera i, and $R_i$ is the rotation matrix for the real camera i. A rotation matrix R is determined by the following definition:

$$R = [n \times y_1, (n \times y_1) \times n, n] \qquad (7)$$

where n is the normal of the camera plane.

After the pre-warp operation 405, a barycentric interpolation of the virtual camera view point C is performed at operation 407. This may include performing a barycentric interpolation using Equation (1) above and the camera viewpoints $C_1, C_2, \ldots, C_n$ for each real camera. This also includes computing the barycentric weights from each real camera.

After that, at operation 409, a virtual image plane is determined by performing a linear feature-based morphing of the real image planes based on barycentric weights from the cameras. For example, in FIG. 5C, a virtual image plane 515 is determined by performing a linear feature-based morphing of the real image planes 511-513.

After that, at operation 411, a post-warp operation is performed on the virtual image plane to rotate the virtual image to a desired pose for the virtual view. For example, in FIG. 5D, the virtual image 515 is rotated to the desired pose using a post-warp operation. For the post-warping operation, the desired pose of the virtual view is interpolated, and a homography transformation $H_{st}$ is performed. In some embodiments, spherical linear interpolation of three quaternions can be used to achieve the interpolation, as follows:

$$q_{st} = \text{Spherical\_Interp}(q_1, q_2, q_3, s, t)$$

$$R_{st} = \text{Rotation\_Matrix}(q_{st})$$

$$H_{st} = K_{st} R (K_{st} R_{st})^{-1} \qquad (8)$$

where $q_i$ are the quaternions of the corresponding rotation matrices of the cameras.

Once the virtual image plane has been post-warped to the desired pose, the synthesized image of the virtual view can be output to a display device.

Although FIG. 4 illustrates one example of a method 400 for generalized view morphing over a multi-camera mesh, various changes may be made to FIG. 4. For example, while shown as a series of steps, various steps shown in FIG. 4 could overlap, occur in parallel, occur in a different order, or occur multiple times. Moreover, some steps could be combined or removed and additional steps could be added according to particular needs. As a particular example, the method 400 may also include a pre-computational operation to feature match across the multiple views. This may be done offline before the view morphing. As another particular example, GPU (graphics processing unit) acceleration may be used to improve real-time performance.

The generalized view morphing method 400 can also be extended to stereoscopic applications for use in creating virtual 3D images. For example, instead of determining only one virtual view, it is possible to perform the method 400 twice to determine two virtual views that represent two physically separated viewpoints. The two virtual views can then be integrated or combined in a stereoscopic application to create a virtual 3D image.

Test results of the generalized view morphing method 400 are promising. In prototype systems performing the method 400, greater than 90 frames per second (90 fps) performance has been achieved using GPU acceleration. In some prototype systems, parallel image warping with GPU was implemented using a CUDA (Compute United Device Architecture) platform to achieve real-time performance.

Figure 6:
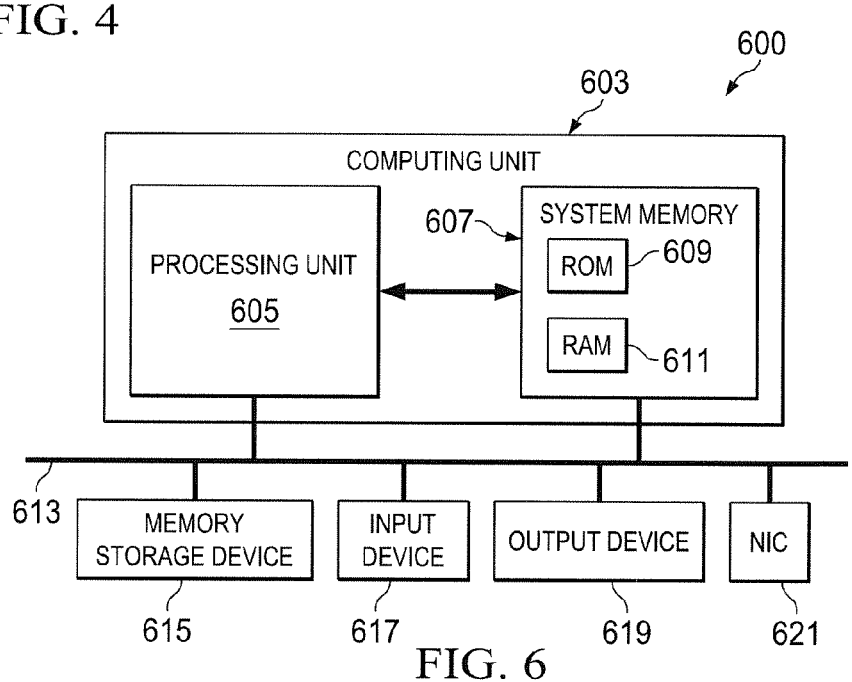
FIG. 6 illustrates an example of a computing device for performing the generalized view morphing method of FIG. 4 in accordance with disclosure.
Figure 5B:
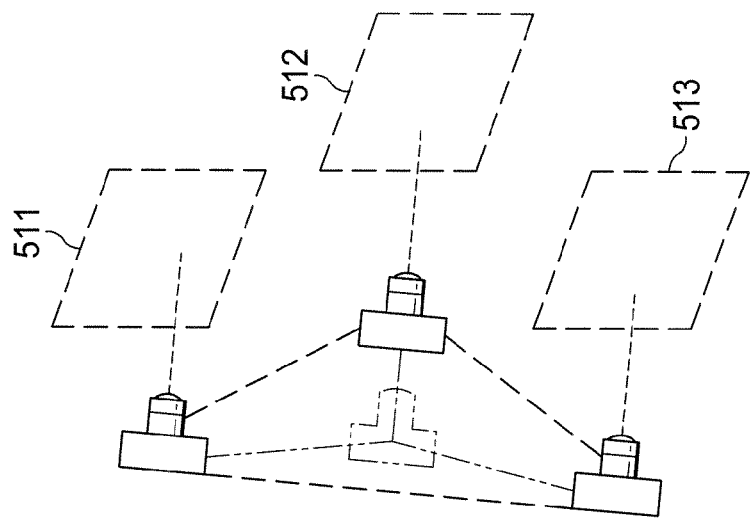
FIGS. 5A through 5D illustrate operations in the generalized view morphing method of FIG. 4 in accordance with this disclosure.
Figure 5A:
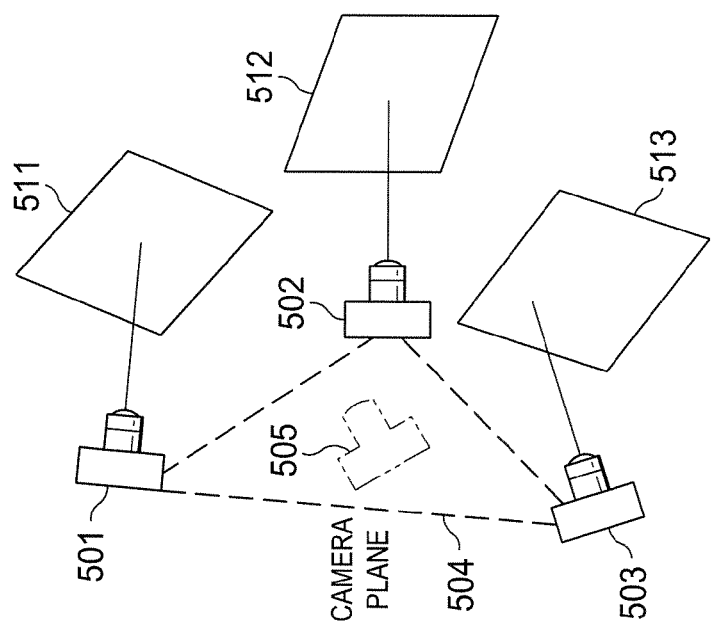
Figure 5D:
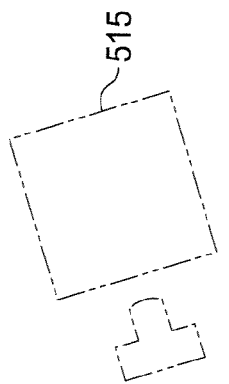
Figure 5C:
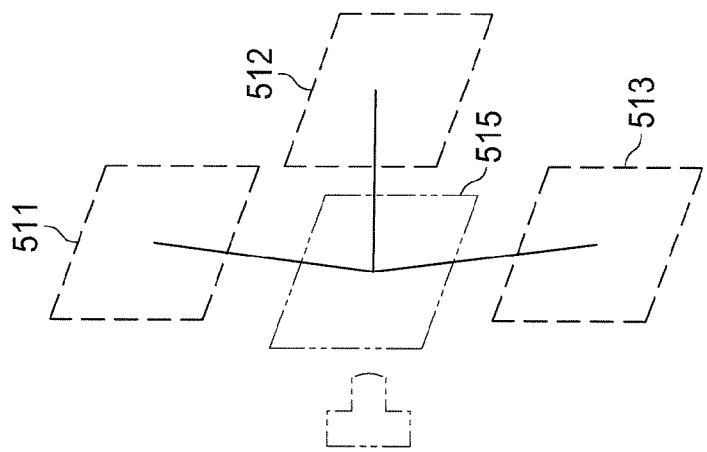

FIG. 6 illustrates an example of a computing device 600 for performing the generalized view morphing method 400 of FIG. 4 in accordance with disclosure. As shown in FIG. 6, the computing device 600 includes a computing block 603 with a processing block 605 and a system memory 607. The processing block 605 may be any type of programmable electronic device for executing software instructions, but will conventionally be one or more microprocessors. The system memory 607 may include both a read-only memory (ROM) 609 and a random access memory (RAM) 611. As will be appreciated by those of skill in the art, both the read-only memory 609 and the random access memory 611 may store software instructions for execution by the processing block 605.

The processing block 605 and the system memory 607 are connected, either directly or indirectly, through a bus 613 or alternate communication structure, to one or more peripheral devices. For example, the processing block 605 or the system memory 607 may be directly or indirectly connected to one or more additional memory storage devices 615. The memory storage devices 615 may include, for example, a "hard" magnetic disk drive, a solid state disk drive, an optical disk drive, and a removable disk drive. The processing block 605 and the system memory 607 also may be directly or indirectly connected to one or more input devices 617 and one or more output devices 619. The input devices 617 may include, for example, a keyboard, a pointing device (such as a mouse, touchpad, stylus, trackball, or joystick), a touch screen, a scanner, a camera, and a microphone. The output devices 619 may include, for example, a display device, a printer and speakers. Such a display device may be configured to display video images. With various examples of the computing device 601, one or more of the peripheral devices 615-619 may be internally housed with the computing block 603. Alternately, one or more of the peripheral devices 615-619 may be external to the housing for the computing block 603 and connected to the bus 613 through, for example, a Universal Serial Bus (USB) connection or a digital visual interface (DVI) connection.

With some implementations, the computing block 603 may also be directly or indirectly connected to one or more network interfaces cards (NIC) 621, for communicating with other devices making up a network. The network interface cards 621 translate data and control signals from the computing block 603 into network messages according to one or more communication protocols, such as the transmission control protocol (TCP) and the Internet protocol (IP). Also, the network interface cards 621 may employ any suitable connection agent (or combination of agents) for connecting to a network, including, for example, a wireless transceiver, a modem, or an Ethernet connection.

It should be appreciated that the computing device 600 is illustrated as an example only, and it not intended to be limiting. Various embodiments of this disclosure may be implemented using one or more computing devices that include the components of the computing device 600 illustrated in FIG. 6, or which include an alternate combination of components, including components that are not shown in FIG. 6. For example, various embodiments of the invention may be implemented using a multi-processor computer, a plurality of single and/or multiprocessor computers arranged into a network, or some combination of both.

The embodiments disclosed herein provide methods that generalize view morphing on an arbitrary multi-camera mesh so that a virtual view can be synthesized on any point on the camera mesh surface, as long as the virtual Field of View is covered in the real cameras. The disclosed methods allow view morphing with either automatically detected, matched features or manually labeled features. These methods provide an open framework for virtual view synthesis from multiple cameras, without sacrificing resolution and cost. The disclosed methods accommodate many linear feature-based morphing algorithms (e.g., point-based, line-based, and the like). In some embodiments, GPU may be used to achieve real-time generalized view morphing (>90 fps).

Compared to the multi-view stereo technique shown in FIG. 2A, the disclosed methods are an image-based approach and do not require 3D reconstruction. Thus, the disclosed methods are robust enough to manage textureless regions, occlusions, challenging materials, and the like. In addition, the disclosed methods are faster and less computationally expensive than the multi-view stereo technique.

Compared to the light field technique shown in FIG. 2B, the disclosed methods do not require a dense camera array setup, and use only a few cameras for interpolation. Thus, the methods described herein do not need high bandwidth and expensive hardware setup. They also allow high spatial resolution image warping. Compared to the traditional two-camera view morphing shown in FIG. 2C, the disclosed methods can work on a general multi-camera mesh, and thus are much more flexible. The methods described herein also do not need a user to manually label different features.

In some embodiments, some or all of the functions or processes of the one or more of the devices are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for generalized view morphing, the method comprising:
   determining a camera plane based on a predetermined view point of a virtual camera associated with a desired virtual image, the camera plane comprising at least three real cameras;
   pre-warping at least three image planes such that all of the image planes are parallel to the camera plane, each image plane associated with one of the real cameras positioned in the camera plane;
   determining a virtual image plane by performing a linear interpolation morphing on the at least three image planes; and
   post-warping the virtual image plane to a predetermined pose wherein the at least three real cameras comprise three cameras, and wherein the linear interpolation morphing is performed according to the equation:

$$u_{st}=K_{st}P=s \cdot u_0+t \cdot u_1+(1-s-t) \cdot u_2$$

where $u_{st}$ is a projection of a physical point P on the virtual image plane, $K_{st}$ is an intrinsic matrix of the virtual camera, $u_0$, $u_1$, $u_2$ are projections of the physical point P on the three image planes respectively, and s and t are barycentric weighting factors.

2. The method of claim 1, further comprising, before determining the camera plane, determining the view point of the virtual camera based on a desired point of view of a physical object.

3. The method of claim 1, wherein pre-warping the at least three image planes comprises performing a homography transformation for each of the image planes, the homography transformation performed according to the equation:

$$H_i=K_iR(K_iR_i)^{-1}$$

where $H_i$ is a homography transformation matrix for the real camera i in the camera plane, $K_i$ is an intrinsic matrix of the real camera i, and $R_i$ is a rotation matrix for the real camera i.

4. The method of claim 1, wherein the at least three real cameras comprises four real cameras and the camera plane is substantially rectangular in shape with one of the four real cameras at each vertex of the camera plane.

5. The method of claim 1, wherein the at least three real cameras comprise a subset of a network of real cameras arranged in a three-dimensional space.

6. The method of claim 1, further comprising:
   performing the determining, pre-warping, determining, and post-warping operations based on a second predetermined view point of a second virtual camera to generate a second virtual image plane; and
   combining the virtual image plane and the second virtual image plane into a three-dimensional stereoscopic image.

7. An apparatus for generalized view morphing, the apparatus comprising:
   at least one memory; and
   at least one processor coupled to the at least one memory, the at least one processor configured to:
      determine a camera plane based on a predetermined view point of a virtual camera associated with a desired virtual image, the camera plane comprising at least three real cameras;
      pre-warp at least three image planes such that all of the image planes are parallel to the camera plane, each image plane associated with one of the real cameras positioned in the camera plane;
      determine a virtual image plane by performing a linear interpolation morphing on the at least three image planes; and
      post-warp the virtual image plane to a predetermined pose,
   wherein the at least three real cameras comprise three cameras, and wherein the linear interpolation morphing is performed according to the equation:

$$u_{st}=K_{st}P=s \cdot u_0+t \cdot u_1+(1-s-t) \cdot u_2$$

where $u_{st}$ is a projection of a physical point P on the virtual image plane, $K_{st}$ is an intrinsic matrix of the virtual camera, $u_0$, $u_1$, $u_2$ are projections of the physical point P on the three image planes respectively, and s and t are barycentric weighting factors.

8. The apparatus of claim 7, wherein the at least one processor is further configured to, before determining the camera plane, determine the view point of the virtual camera based on a desired point of view of a physical object.

9. The apparatus of claim 7, wherein to pre-warp the at least three image planes, the at least one processor is configured to perform a homography transformation for each of the image planes, the homography transformation performed according to the equation:

$$H_i=K_iR(K_iR_i)^{-1}$$

where $H_i$ is a homography transformation matrix for the real camera i in the camera plane, $K_i$ is an intrinsic matrix of the real camera i, and $R_i$ is a rotation matrix for the real camera i.

10. The apparatus of claim 7, wherein the at least three real cameras comprises four real cameras and the camera plane is substantially rectangular in shape with one of the four real cameras at each vertex of the camera plane.

11. The apparatus of claim 7, wherein the at least three real cameras comprise a subset of a network of real cameras arranged in a three-dimensional space.

12. The apparatus of claim 7, the at least one processor further configured to:
   perform the determining, pre-warping, determining, and post-warping operations based on a second predetermined view point of a second virtual camera to generate a second virtual image plane; and
   combine the virtual image plane and the second virtual image plane into a three-dimensional stereoscopic image.

13. A non-transitory computer readable medium embodying a computer program, the computer program comprising computer readable program code for:
   determining a camera plane based on a predetermined view point of a virtual camera associated with a desired virtual image, the camera plane comprising at least three real cameras;
   pre-warping at least three image planes such that all of the image planes are parallel to the camera plane, each image plane associated with one of the real cameras positioned in the camera plane;

determining a virtual image plane by performing a linear interpolation morphing on the at least three image planes; and post-warping the virtual image plane to a predetermined pose, wherein the at least three real cameras comprise three cameras, and wherein the linear interpolation morphing is performed according to the equation:

$$u_{st}=K_{st}P=s \cdot u_0 + t \cdot u_1 + (1-s-t) \cdot u_2$$

where $u_{st}$ is a projection of a physical point P on the virtual image plane, $K_{st}$ is an intrinsic matrix of the virtual camera, $u_0$, $u_1$, $u_2$ are projections of the physical point P on the three image planes respectively, and s and t are barycentric weighting factors.

14. The non-transitory computer readable medium of claim 13, the computer program further comprising computer readable program code for:

before determining the camera plane, determining the view point of the virtual camera based on a desired point of view of a physical object.

15. The non-transitory computer readable medium of claim 13, wherein pre-warping the at least three image planes comprises performing a homography transformation for each of the image planes, the homography transformation performed according to the equation:

$$H_i = K_i R (K_i R_i)^{-1}$$

where $H_i$ is a homography transformation matrix for the real camera i in the camera plane, $K_i$ is an intrinsic matrix of the real camera i, and $R_i$ is a rotation matrix for the real camera i.

16. The non-transitory computer readable medium of claim 13, wherein the at least three real cameras comprises four real cameras and the camera plane is substantially rectangular in shape with one of the four real cameras at each vertex of the camera plane.

17. The non-transitory computer readable medium of claim 13, wherein the at least three real cameras comprise a subset of a network of real cameras arranged in a three-dimensional space.

18. The non-transitory computer readable medium of claim 13, the computer program further comprising computer readable program code for:

performing the determining, pre-warping, determining, and post-warping operations based on a second predetermined view point of a second virtual camera to generate a second virtual image plane; and combining the virtual image plane and the second virtual image plane into a three-dimensional stereoscopic image.

* * * * *